UNITED STATES PATENT OFFICE.

JAMES S. MOREL, OF SAVANNAH, GEORGIA, AND DAVID R. FLETCHER, OF CHAMBERSBURG, OHIO, ASSIGNORS OF ONE-THIRD THEIR RIGHT TO JAMES A. WATTERSON, OF MERCER'S BOTTOM, WEST VIRGINIA.

IMPROVEMENT IN PLASTIC COMPOUNDS FOR PAVING AND OTHER PURPOSES.

Specification forming part of Letters Patent No. 201,274, dated March 12, 1878; application filed April 14, 1877.

*To all whom it may concern:*

Be it known we, JAMES S. MOREL, of Savannah, county of Chatham and State of Georgia, and DAVID R. FLETCHER, of Chambersburg, county of Gallia, State of Ohio, have invented a new and valuable Improvement in Compounds; and we do hereby declare that the following is a full, clear, and exact description of the same.

The nature of our invention consists in a compound material or body, as will be hereinafter more fully set forth.

This compound material is composed of the following ingredients, viz: Coal-tar reduced by heat at the boiling-point until it obtains a density that renders it capable of resisting about 190° of heat without change, mixed with the fiber of wood in small particles, such as shavings, sawdust, or other small particles of wood.

The wood particles are to be rendered perfectly dry by being subjected to heat. We use one part of the boiled coal-tar, as described, to about four parts of the woody material, or a sufficient quantity of the former to cover each atom or particle of the latter, and the new material is made as follows: The boiled coal-tar, as described, being at boiling-point, is conducted into a large shallow pan or box, which contains the woody material, and is then rapidly stirred or mixed together until the two are thoroughly incorporated together. The material is then placed in suitable molds and subjected to a powerful pressure of any kind — either screw or roller, hydrostatic, steam, or hand power. After remaining a suitable length of time in the molds it is removed from them, which completes the process of making the material.

By the chemical and mechanical action brought to bear on the crude material a new material is produced, which differs essentially from one or both in their crude state. This new material is plastic, and capable of being worked into any form or shape, and of resisting all ordinary temperature of climate. It is insoluble in and impervious to water at ordinary temperature, making, therefore, a material which is almost indestructible for all purposes for which it is intended, except the wear and tear in using it. It may be used for paving, flooring, roofing, moldings, burial-cases, fence-posts, sculpturing, and many other purposes.

What we claim as new, and desire to secure by Letters Patent, is—

As a new article of manufacture, a compound consisting of coal-tar treated by heat so as not to be softened at a temperature of 190°, and mixed with woody fiber, substantially as described, and for the purpose set forth.

In testimony that we claim the above we have hereunto subscribed our names in the presence of two witnesses.

J. S. MOREL.
DAVID R. FLETCHER.

Witnesses to signature of J. S. Morel:
JOHN D. ROSS,
JOHN F. BLACKMAN.

Witnesses to signature of D. R. Fletcher:
S. V. CLARK,
GEORGE E. UPHAM.